June 8, 1965
A. M. CADDELL
3,187,731
OSCILLATORY VALVES AND FLUID-SEAL MEANS THEREFOR
Filed Oct. 3, 1962
2 Sheets-Sheet 1
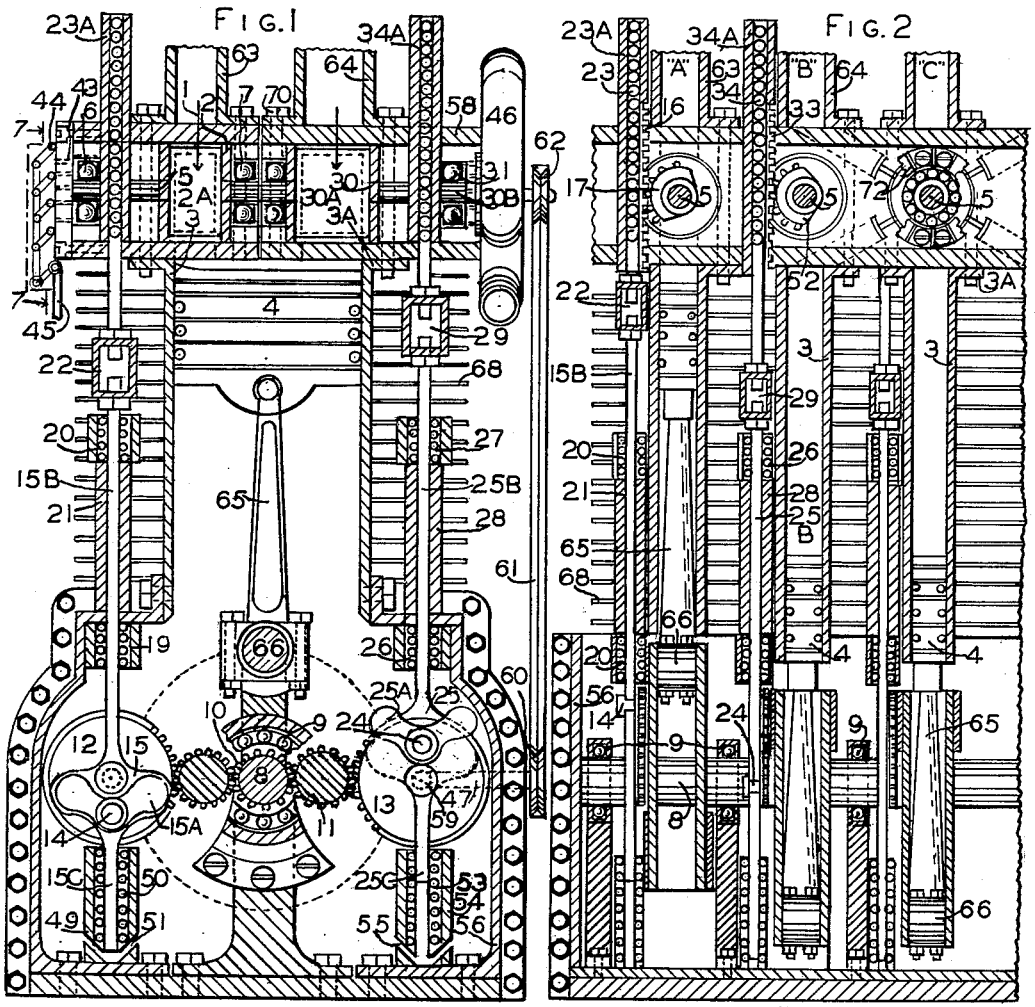
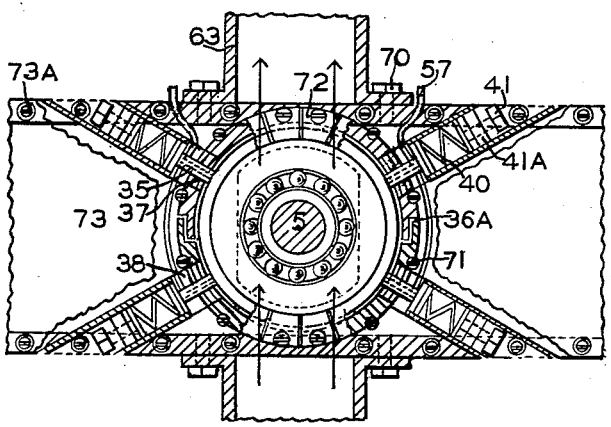
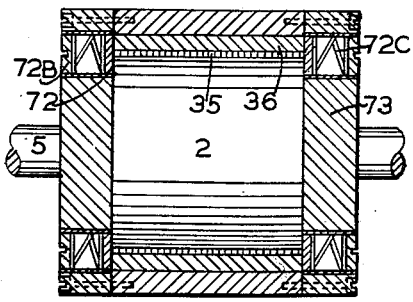
INVENTOR.
Alfred M. Caddell June 8, 1965 A. M. CADDELL 3,187,731
OSCILLATORY VALVES AND FLUID-SEAL MEANS THEREFOR
Filed Oct. 3, 1962 2 Sheets-Sheet 2
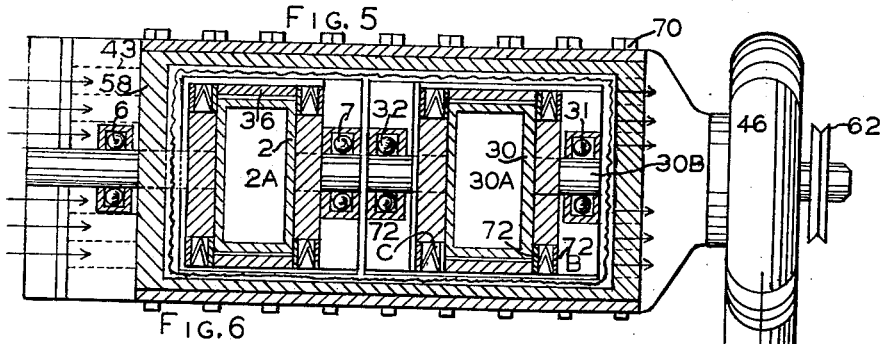
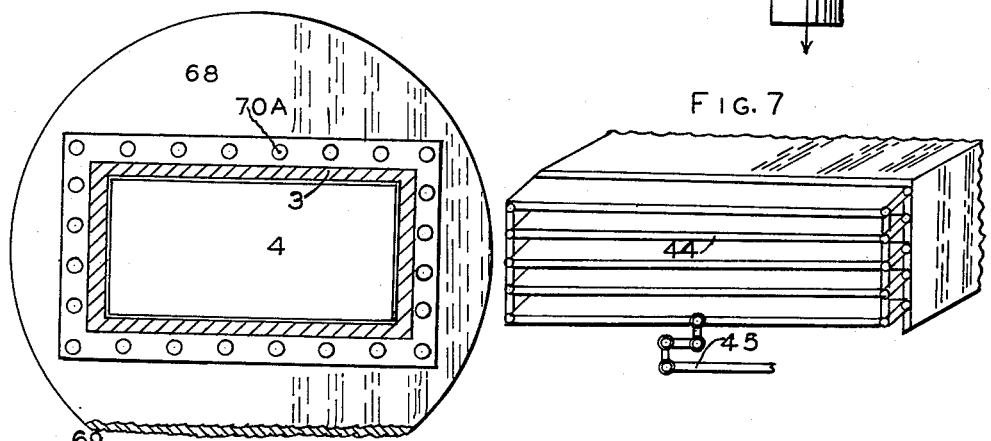
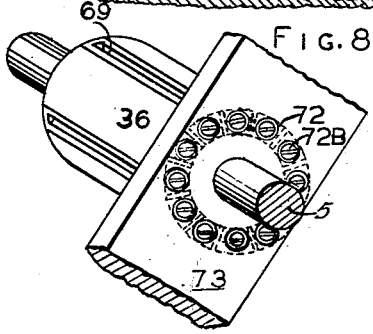
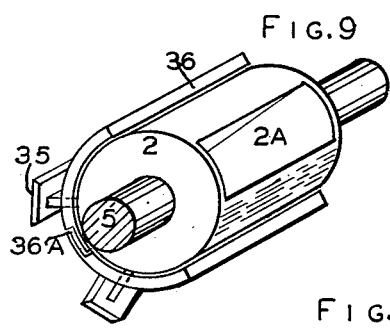
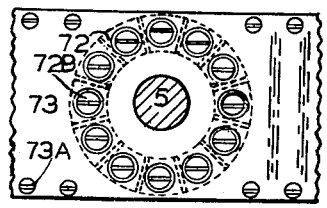
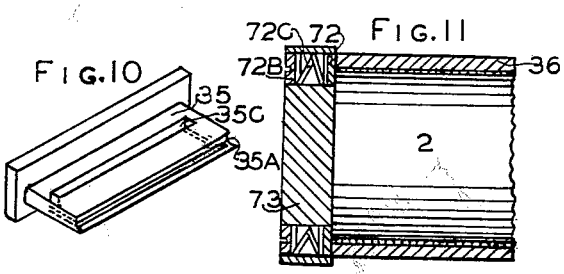
INVENTOR.
Alfred M. Caddell United States Patent Office 3,187,731
Patented June 8, 1965

3,187,731
OSCILLATORY VALVES AND FLUID-SEAL
MEANS THEREFOR
Alfred M. Caddell, 1318 W. Hunting Park Ave.,
Philadelphia, Pa.
Filed Oct. 3, 1962, Ser. No. 228,152
6 Claims. (Cl. 123—81)

This is a continuation-in-part application, carrying the same title as Serial No. 812,666, filed May 12, 1959, Oscillatory Valves and Fluid-Seal Means Therefor, which is now abandoned.

This invention pertains to oscillatory valves for use in reciprocating engines. To obtain maximum benefits therefrom, it is proposed to mount the valves in the heads of oblong chambers of an engine having one or more four-sided pistons, such as the type described in Patent No. 3,068,850 Four-Sided Piston With Fluid Sealing Means.

One of the objects of the instant invention is to make available valves that may be positively opened and positively closed without employing springs which, in the case of poppet valves, consume a lot of power to operate. It has been estimated that in aviation reciprocating engines upwards of 100 H.P. is lost in poppet valve operation. Moreover, the use of springs results in serious valve bounce and float at high engine speeds.

Another object is to partially surround the valves with removable sleeves composed of a heat resisting alloy and to provide an adequate, fully concentric clearance space between the valve and its coacting sleeves to withstand any warpage that may develop in an engine head due to high heat and also to provide sealing means extending through the sleeves and said space to contact the rounded surfaces of the valve for effecting non-leakage of the working fluid.

An equally important object too is to prevent leakage between the sides of the engine head and the end faces of the valve by providing spring-loaded contact member mounted in the sides opposite said end faces and bearing thereagainst.

A fourth object is to make it possible to install valves having apertures extending therethrough in a chamber head directly above a piston in order that direct inflow of the working fluid and direct outflow of the exhaust through the head may be facilitated without any obstructions in the passageway, such as valve stems and heads.

A fifth object is to make available a valve that is unaffected by inertia. Due to a high value of inertia being present in all high-speed reversible motions, such as in the employment of poppet valves, valve float and bounce greatly limit their effectiveness, the valves being off their seats a considerable portion of their operating time and negating compression and combustion pressures.

A sixth object is to make available a valve that does not protrude at all into the combustion chamber of an engine nor interfere with the movement of a piston in any way.

Other objects and advantages associated with this oscillatory valve will be set forth as the herein description proceeds.

In the drawings:

FIG. 1 is a cross-sectional side view of an engine having oblong chamber construction, a head that permits internal cooling and the intake and exhaust oscillating valve installations. Timing gears connected to the engine's crankshaft and linkage to operate the valves are also shown, as well as eccentric pins and slidable yokes for converting rotary motion into reciprocal motion to impart oscillatory motion to the valves.

FIG. 2 is a cross-sectional end view of the engine wherein a view of two valves are shown, one designated "A" in an open and the other "B" in a closed position, as per dotted outlines through the valves. The third valve "C" shows an open exhaust valve and spring-tension compression sealing members pressing against the valve's peripheral surface; also spring-loaded contact blocks mounted in removable sides of the head are shown pressing against the end of the valve adjacent its periphery to prevent leakage of working fluid between the sides of the head and the valve.

FIG. 3 is an enlarged cutaway end view of the valve shown in the "C" section of FIG. 2. Also shown are a pair of twin-half sleeves that spatially, though only partially encompass the valve; also compression sealing members extending through slots in an oilless bearing compound positioned in the sleeves, the stems of said members making contact with the rounded surface of the valve; adjustable spring-tension screw bolts for maintaining pressurized contact via compression springs against the sealing members and lubricating channels leading from an exterior source and continuing through the members to maintain constant lubrication between the ends of the stems and the valves; also valve end contact blocks for preventing leakage of the working fluid between the sides of the head and the end of the valve.

FIG. 4 is an enlarged side view of an exhaust valve showing the spring-loaded sealing blocks mounted in the sides of the engine head.

FIG. 5 is a view, looking downward, of the engine head, in which view is shown the intake and the exhaust valves together with their end shafts. Also shown in dotted outline are a plurality of air-flow passageways to a blower which draws cooling air therethrough and expels it to atmosphere.

FIG. 6 is a view, looking downward, showing the outline of the engine's combustion chamber, the head thereof having been removed. A plurality of holes 70A for receiving bolts 70 are shown. Also, the piston and circular top rib of a plurality of ribs 68 for lending strength to the non-round chamber walls.

FIG. 7 shows the intake cooling air shutters taken on lines 7—7, FIG. 1, which shutters may be adjusted via any desired means.

FIG. 8 is a three-quarter view of a valve and its sleeves, showing slots extending therethrough for receiving compression-sealing members.

Also shown is a number of contact sealing blocks positioned against the ends of the sleeve and the valve.

FIG. 9 is an enlarged three-quarter end view of the oscillating valve showing the aperture therethrough and a pair of compression sealing members making surface contact with the valve.

FIG. 10 is a view of a single compression-sealing member showing the oil intake slot in the side which leads to a passageway within the member that, in turn, maintains bearing contact with the valve.

FIG. 11 is a partial view of a valve showing the spring-loaded block means for making contact against the end of the valve.

FIG. 12 is a partial view of an engine head side showing positioning of the spring-loaded blocks in the side and the adjustable screw means for imparting tension to the springs.

Although the engine shown in FIGS. 1 and 2 has its basis in Patent No. 3,068,850, the mounting and operation of the valves of this invention are included in these figures. Inasmuch as many features of the engine are affected by such valve operation, they are identified herein.

The fuel-air mixture, or in case of fuel injection, air alone enters combustion chamber 3, FIG. 1, as per directional arrow 1, passing through passageway 2A of intake valve 2, the overall area of which is shown clearly in FIG. 9. After passing through the valve, the fuel-air mixture is deflected toward the far side of the combustion chamber by virtue of the curved top of piston 4, shown in FIG. 1. In this connection, it is well-known that the more pronounced the turbulence of the mixture, the better it becomes oxidized, the better will be the combustion and the greater the power output of the engine.

As shown in FIGS. 3, 4, 8 and 9, intake valve 2 is cylindrical in design, having end shafts 5 formed integrally therewith. These shafts are cradled in end bearing assembly 6 and center bearing assembly 7, FIG. 1, to permit anti-frictional oscillation of the valve.

As shown in FIGS. 1 and 5, exhaust valve 30, mounted on shaft 30B, is cradled between bearing assemblies 31 and 32.

The power for oscillating the valves is obtained from crankshaft 8 of the engine, which crankshaft is positioned between bearings 9, shown in FIGS. 1 and the "C" part of FIG. 2. Ring gear 10, FIG. 1, is mounted securely on crankshaft 8. Intermediary gears 11 engage ring gear 10 on each of its sides and transmit power to each of the timing gears 12 and 13 respectively. Timing gear 12 actuates the intake valve and timing gear 13 the exhaust valve.

Journal pin 14 is mounted off-center on timing gear 12, the pin thereby traveling in an eccentric orbit when this gear revolves. A combination yoke 15 and push-pull rod assembly 15B comprises the means employed to convert rotary into reciprocal motion. Yoke 15, which has a spaced, double-bar, rounded-end construction, provides a travelway into which journal pin 14 protrudes. This yoke, in responding to the eccentric orbit of journal 14, accommodates the sidewise travel of this pin and is, in turn, affected reciprocally thereby. It actuates push-pull rod 15B of the assembly and rack gear 16, which is made integral with said rod (shown at top, FIG. 2) and which meshes with quarter-circle gear 17 mounted on valve shaft 5. The valve thus oscillates to the extent of the orbital throw of journal pin 14, bringing the passageway of the valve into and out of line with the walls of the expansion chamber.

Timing gears 12 and 13 have twice the diameter of ring gear 10 and intermediary gears 11, thereby providing, as in four-cycle operation, opening and closing of the valve every other revolution of the crankshaft.

As will be noted, yoke 15 has a curved construction 15A in its central area. By making it necessary for pin 14 to travel over a greater yoke area, the effect is to provide a longer hold-open time at the full-open position of the valve, which is at the zenith of the orbital throw; which time is recovered, or speeded up, during the closing phase of the valve. The longer the hold-open time in the full-open position, the greater the intake of motive fluid per opening of the valve.

Extension 15C, made integral with yoke 15, extends downwardly into housing 49, positioned in the base section of crankcase 56. A longitudinally disposed ball-bearing assembly 50 is provided in this housing to engage 15C anti-frictionally and simultaneously maintain accurate alignment of the combination yoke and rod assembly. Housing 49 has vent apertures 51 at the lower terminus thereof to permit alternate intake and expulsion of crankcase lubricating oil.

Upper rod section 15B is likewise held in accurate alignment by means of its passing through bearings 19 and 20, which are joined by encompassing guide housing 21. Turnbuckle 22 is provided to permit micromatic adjustability of rod 15B, said rod thereafter continuing upwardly to merge with rack gear 16, which also is maintained in anti-frictional alignment by means of perpendicular ball bearing assembly 23, supported by perpendicular housing 23A, against which the supporting back of rack gear 16 makes slidable contact.

On the exhaust side of the engine, intermediary gear 11, FIG. 1, drives timing gear 13. Journal pin 24, protruding from the face of gear 13, is encompassed by yoke 25, which converts the rotary motion of gear 13 into reciprocating motion for actuating, by means of rack gear 33, quarter-circle gear 52, mounted on shaft 30B of exhaust valve 30, the oscillatory action of which is similar to that of the intake valve. Yoke 25 is maintained in accurate travel alignment by means of extension 25C reciprocating between perpendicular bearing assembly 53 in housing 54 positioned in crankcase 56. Vent apertures 55 are provided in the base of housing 54 to permit alternate intake and expulsion of crankcase lubricating oil.

Like on the intake side of the engine, yoke 25 has a curved section 25A, causing push-pull rod 25B to ride higher than it normally would. As pointed out in connection with the intake valve, this action permits longer hold-open time for more thorough exhausting, which is a very important factor in engine operation.

Rod 25B passes through longitudinally disposed bearing assemblies 26 and 27, which are spaced from each other by guide housing 28. Turnbuckle 29 permits minute adjustments to be made in the length of rod 25B, said adjustments affecting the timing of quarter-circle gear 52. Although shown in similar functioning positions, in practice the opening and closing of the intake valve would be timed somewhat differently from that of the exhaust valve. While similar in outer appearance and mounting to the intake valve, the exhaust valve has a larger aperture 30A, which permits unrestricted and more thorough exhausting of the spent gases.

End shafts 30B of exhaust valve 30 are mounted between outer bearing assembly 31 and centrally positioned bearing assembly 32. Rack gear 33, which is made integral with rod 25B, has sliding contact with longitudinally disposed bearing assembly 34, mounted in housing 34A. As in the case of the intake valve, quarter-circle gear 52 is secured to end shaft 30B and actuated by rack gear 33 to bring the walls comprising the valve's passageway into line with the walls of expansion chamber 3 and then return them to an out-of-line position, thus effecting closure of the valve.

Both the intake and the exhaust valves are made leakproof on their peripheral surfaces by adjustable compression-sealing members 35, shown in position above the "C" chamber in FIG. 2, also in FIGS. 3 and 9 and separately in FIG. 10. Also shown in position in FIGS. 2, 3 and 12 and separately in FIGS. 4 and 11 are spring-loaded blocks 72, which are installed in sides 73, said sides being removably secured by bolts 73A to the engine head, shown clearly in FIG. 3. Blocks 72 are urged inwardly from said sides by means of springs 72C, incorporated in the block assembly, FIGURES 4 and 11. As shown in FIG. 12, screw 72B, which threadably engages holes 73B in side 73 as shown in FIG. 8, lends whatever tension is required so that block 72 shall have leakproof contact with the ends of the valve during its oscillations. Lubrication of these blocks, which are individually installed in the sides of the head, is effected by means of oil contactingly received from the peripheral surface of the valve which primarily receives it from the stem of the sealing member 35.

Twin-half sleeves 36 spatially surround the valves. These sleeves occupy recesses formed in the engine head and are secured thereto by means of bolts 71, shown in FIG. 3. Bolts 71 may be installed in slightly oversized holes to permit linear expansion of the sleeves if necessary. However, it is proposed to manufacture these sleeves of an alloy which maintains its prescribed dimensions under any degree of heat encountered in internal combustion engine operation.

In passing through these sleeves, the members 35 are supported freely by oilless inserts 37, FIG. 3, which are composed of graphite impregnated sections that are impervious to combustion heat and corrosive attack. The ends of the members 35 are carefully ground and lapped to correspond to the contour of the valves, against which they make leakproof contact, as indicated at 35A, FIG. 10. Both the sleeves and sealing members must have precision length to guard against compression and combustion gas leakage. Taken in conjunction with valve-end blocks 72, a slidable contact is thus made over the entire area of the valves that would be subject to leakage.

Compression-seal members 35 are of T construction, the head part thereof being formed at a right angle to the stem or sealing part. To be effective, a member must press against the valve surface. As a means of providing regulated pressure, compression springs 40, FIG. 3, press against the top of the T construction. These springs, in turn, may be given suitable pressure by means of screw bolts 41 which, after being adjusted, may be locked in position by lock-nuts 41A.

Sleeves 36 may be of solid or twin-half construction. If the latter type is employed, slight spaces, as at 36A, may be provided between the meeting ends to permit linear expansion under high-heat operating conditions. By providing such space for expansion, the relation between the valve and its sleeves will not be affected at any time. FIG. 8 shows openings 69 for receiving sealing members 35.

In practice, sleeves 36 may be spaced from 10 to 20 thousandths of an inch (.010–.020) from the valve to permit absolute freedom of operation under high-heat operating conditions. To assist in freedom of action and to secure certainty of the gas seal, heat-resisting lubricating oil may be introduced to the valve contact area by means of tubes 57 conveying said oil from a source external to the engine. Fig 3 shows this oil-conveying type of tube, which passes through inserts 38 in the head, FIG. 3, to reach sealing members 35. FIG. 10 shows a means whereby the oil, after lubricating the members externally, may be picked up by aperture 35C, FIG. 10, in the stem part thereof, whence it travels through a passageway in the sealing member to its contoured base for effecting lubrication between itself and the valve.

A plurality of air-flow channels 43, shown in dotted outline in FIG. 5, are provided in head 58 of chamber 3. These channels are designed to extend through the head from the intake to the exhaust side; also they may curve to pass close to the valve mechanism for absorbing heat therefrom. Controllable shutter means 44 is provided to control the flow of cooling air, which shutters may be caused to function by thermo-control or manual means, as per 45, FIG. 1. Shutter means 44 is shown in position in FIG. 1 and separately in FIG. 7, as per lines 7—7, FIG. 1.

Blower 46, FIGS. 1 and 5, may be mounted adjacent to the heads of the engine's chambers, as shown, or it may be placed at any other convenient location for drawing cooling air through channels 43 shown in FIG. 5 in head 58. This blower may be powered by belt drive taken off gearing 59 in crankcase 56 via shaft 47, on which pulley 60 is mounted to actuate V-belt 61 for rotating pulley 62 of the blower.

Fuel-air mixture, or other motive fluid, is conveyed to the intake valve from a source, not shown, via conduit 63, and the exhaust gas is conveyed from the engine via duct 64, said conduit and duct being shown in FIGS. 1, 2 and 3. Both the conduit and duct are secured to the chamber head, the walls thereof paralleling the walls of the chamber so that when the walls forming the passageways of the valves are turned to a through-flow position, both the intake of motive fluid and the discharge of spent motive fluid takes place in a direct line—this to aid in filling the chamber with fresh motive fluid at the beginning of every cycle and to promote unrestricted exhaust discharge.

Connecting rod 65, FIG. 1, connects piston 4 with journal 66 conventionally associated with crankarm 67 to which crankshaft 8 is made integral. The walls of the chamber are encompassed by cooling fins, or ribs 68 which also lend compensatory strength to the unevenly dimensioned chamber walls. These fins are shown in FIGS. 1 and 2, and also in a top view of FIG. 6.

Bolts 70, FIGS. 1 and 5, secure head 58 to the walls of chamber 3, an encompassing flange 3A being provided for that purpose. Holes 70A are indicated in FIG. 6 for receiving bolts 70.

For the purposes of clarity, other constructional features of the engine, although foreign to the instant application, are also shown herein.

Having described my invention, I claim:

1. The combination in an internal combustion engine of a head having an aperture, a combustion chamber and an oscillatory ported valve, said valve having end faces and a rounded surface therebetween, removable sides of said head, a pair of semi-circular sleeves partially surrounding said valve and being removably secured in said head, said valve having shaft ends anti-frictionally mounted in said head and an integrally formed solid cylindrical portion having a port extending therethrough, said valve being concentrically spaced from said sleeves, pressurized sealing means positioned in said head and extending through the sleeves for contacting said rounded surface, a plurality of constructions housing blocks mounted in said sides, pressurized means in said constructions for urging the blocks inwardly against the end surfaces of said valves, operable means in said engine for causing periodic registration of the port of said valve between said combustion chamber and said aperture.

2. The combination with an oscillatory ported valve having a rounded surface and an apertured head of an internal combustion engine, of a pair of twin-half sleeves set in recesses formed in said head and partially surrounding said valve, means for removably securing said sleeves to said head, a concentrically provided space between said sleeves and said valve for preventing at all times contact of the valve with said sleeves, inserts in said sleeves comprised of an oilless bearing substance, a plurality of openings formed in said head, a like number of individual sealing members removably installed in said openings, said members slidably extending through the oilless bearing inserts and through said space at a right angle relative to the surface of said valve for establishing varying though leakproof contact therewith, removable sides of said head, a plurality of constructions mounted in said sides, said constructions housing blocks and means for exerting pressure of said blocks against the ends of said valve to provide leakproof contact therewith.

3. The combination with an oscillatory ported valve having a rounded surface and an apertured head of an internal combustion engine, of a pair of twin-half sleeves removably recessed in said head and partially though spatially surrounding said valve, a plurality of openings in said head and a like number of individually mounted, adjustable assemblies having sealing members installed in said openings, a compression spring in each of said assemblies and means for varying the pressure against said spring, each of said members having a top abutting its respective spring and an integrally formed stem, anti-frictional guide slots provided through said sleeves, each of said stems extending through its respective slot and being pressurized by its spring to assure contact of said stem with the rounded surface of said valve, removable sides of said head a plurality of constructions mounted in said sides, said constructions housing blocks and means for exerting pressure of said blocks against the ends of said valve to provide leakproof contact therewith.

4. The combination with an oscillatory ported valve having a rounded surface and an apertured head of an internal combustion engine, of a pair of sleeves removably set in said head and partially though spatially surrounding said valve, a plurality of openings in said head and a like number of individually mounted adjustable assemblies having sealing members installed in said openings, means in said assemblies for exerting pressure against said sealing members, oilless bearing guide slots removably installed in said sleeves, each of said members having a stem extending through its respective bearing slot at a right angle to said valve, said stem terminating in an end having a contour corresponding to the rounded contour of the valve for making leakproof contact thereagainst, removable sides of said head, a plurality of constructions mounted in said sides, said constructions housing blocks and means for exerting pressure of said blocks against the ends of said valve to provide leakproof contact therewith.

5. In an internal combustion engine, the combination of a head having an aperture extending therethrough with an oscillatory ported valve having a rounded surface and two ends, of a plurality of adjustable assemblies incorporating sealing members in said head, a pair of sleeves removably installed in said head for partially though spatially surrounding said valve, openings in said sleeves for the extension of said members therethrough, a portion of said members being comprised of a stem, a passageway formed in each of said members, a channel provided through each of said stems, a number of tubes in said head for communicating with an external source of lubricant and said passageways, said stems terminating in an opening extending the full width of the valve for conveying the lubricant to the rounded surface thereof, removable sides of said head, a plurality of constructions mounted in said sides, said constructions housing blocks and means for exerting pressure of said blocks against the ends of said valve to provide leakproof contact therewith.

6. In an internal combustion engine having a head and sides therefor and a chamber for containing pressurized motive fluid, and oscillatory valve having two ends and being mounted in said head and means in said engine for imparting oscillatory motions thereto, a plurality of block constructions mounted in said sides, each of said constructions being comprised of a block, a spring abutting said block and a screw cap having threadable engagement with said sides for exerting pressure against said spring, said blocks being mounted in said sides opposite said valve ends adjacent the periphery of the valve to prevent leakage of said motive fluid between said sides and said valve.

References Cited by the Examiner

UNITED STATES PATENTS

| | | | |
|---|---|---|---|
| 1,353,289 | 9/20 | Stokes | 123—190 |
| 1,513,911 | 11/24 | Keller et al. | 123—190 |
| 1,782,389 | 11/30 | Rauka et al. | 123—190 |
| 1,830,796 | 11/31 | Jones | 123—81 |
| 1,927,348 | 9/33 | Morris | 123—190 |
| 2,129,024 | 9/38 | Reynolds | 123—59 |

FOREIGN PATENTS 980,923    1/51    France.

FRED E. ENGELTHALER, *Primary Examiner.*